United States Patent
Roedts, II et al.

(10) Patent No.: US 10,906,783 B2
(45) Date of Patent: Feb. 2, 2021

(54) LOAD PLACEMENT SYSTEM

(71) Applicant: Columbia Helicopters, Inc., Aurora, OR (US)

(72) Inventors: Robert Lee Roedts, II, Aurora, OR (US); Steven Edmund Bandy, Aurora, OR (US)

(73) Assignee: COLUMBIA HELICOPTERS, INC., Aurora, OR (US)

(*) Notice: Subject to any disclaimer, the term of this patent is extended or adjusted under 35 U.S.C. 154(b) by 246 days.

(21) Appl. No.: 16/105,561

(22) Filed: Aug. 20, 2018

(65) Prior Publication Data

US 2019/0100413 A1 Apr. 4, 2019

Related U.S. Application Data

(60) Provisional application No. 62/550,359, filed on Aug. 25, 2017.

(51) Int. Cl.
| | |
|---|---|
| *B66C 13/06* | (2006.01) |
| *B64D 1/02* | (2006.01) |
| *G05D 1/10* | (2006.01) |
| *B66F 19/00* | (2006.01) |
| *B66C 13/08* | (2006.01) |

(Continued)

(52) U.S. Cl.
CPC ............ *B66C 13/06* (2013.01); *B64C 39/024* (2013.01); *B64D 1/02* (2013.01); *B66C 13/08* (2013.01); *B66F 19/00* (2013.01); *G05D 1/101* (2013.01); *B64C 27/04* (2013.01); *B64C 2201/024* (2013.01); *B64C 2201/12* (2013.01); *B64C 2201/145* (2013.01); *B64C 2201/146* (2013.01); *B64D 1/22* (2013.01); *G05D 1/0858* (2013.01); *H02G 1/02* (2013.01)

(58) Field of Classification Search
CPC .......... B66C 13/06; B66C 13/08; B64D 1/02; B64D 1/22; B66F 19/00; G05D 1/101; G05D 1/0858; B64C 27/04; B64C 2201/024; B64C 2201/12; B64C 2201/145; B64C 2201/146; B64C 39/024; H02G 1/02

See application file for complete search history.

(56) References Cited

U.S. PATENT DOCUMENTS 3,946,971 A * 3/1976 Chadwick ................ B64D 1/08
244/137.4
4,267,987 A * 5/1981 McDonnell ............ B64D 39/00
244/137.4

(Continued)

*Primary Examiner* — Sze-Hon Kong
(74) *Attorney, Agent, or Firm* — Schwabe Williamson & Wyatt

(57) ABSTRACT

A load placement system precisely places slung loads by allowing a helicopter pilot to essentially reel the load to the ground. The placement system uses lead lines on the slung load that can be connected to the ground by support personnel. A winch system is connected to the lead lines and guides the load to an intended location. The placement system eliminates at least some of the ground personnel previously needed for pulling the load to a target location and orientation. The placement system may eliminate substantially all ground personnel by using unmanned aerial vehicles (UAVs) to automatically connect the lead lines to the ground. The UAVs also may actively control the slung load while in flight to reduce pilot workload and enable higher transport speeds.

9 Claims, 6 Drawing Sheets

(51) Int. Cl.
*B64C 39/02* (2006.01)
*B64C 27/04* (2006.01)
*B64D 1/22* (2006.01)
*G05D 1/08* (2006.01)
*H02G 1/02* (2006.01)

(56) References Cited

U.S. PATENT DOCUMENTS

| | | | | |
|---|---|---|---|---|
| 4,378,919 A * | 4/1983 | Smith | | B64D 1/22 244/118.1 |
| 4,695,012 A * | 9/1987 | Lindenbaum | | B64B 1/24 244/137.4 |
| 5,593,113 A * | 1/1997 | Cox | | B64D 1/08 177/245 |
| 7,887,011 B1 * | 2/2011 | Baldwin | | B64C 37/02 244/118.1 |
| 8,534,607 B2 * | 9/2013 | Tardiff | | B64D 17/38 244/137.1 |
| 8,591,161 B1 * | 11/2013 | Bernhardt | | B63B 27/10 414/137.6 |
| 8,643,850 B1 * | 2/2014 | Hartman | | G01S 5/163 356/614 |
| 9,027,976 B1 * | 5/2015 | Tollenaere | | B64D 1/22 244/137.4 |
| 9,223,008 B1 | 12/2015 | Hartman | | B66C 13/085 |
| 9,849,981 B1 * | 12/2017 | Burgess | | B64D 1/12 |
| 10,507,920 B2 * | 12/2019 | Waltner | | F16F 9/067 |
| 2002/0171008 A1 * | 11/2002 | Schuster | | H02G 1/02 244/118.1 |
| 2007/0200032 A1 * | 8/2007 | Eadie | | B66C 13/063 244/137.4 |
| 2009/0146010 A1 * | 6/2009 | Cohen | | G05D 1/0858 244/137.1 |
| 2009/0184196 A1 * | 7/2009 | Price | | B66F 19/00 244/33 |
| 2010/0001139 A1 * | 1/2010 | Humbert | | B66C 1/34 244/137.4 |
| 2010/0288872 A1 * | 11/2010 | Wiley | | B64D 1/22 244/33 |
| 2011/0116905 A1 * | 5/2011 | Von Kessel | | F03D 13/40 414/800 |
| 2011/0192932 A1 * | 8/2011 | Brenner | | B64C 27/04 244/17.13 |
| 2013/0054054 A1 * | 2/2013 | Tollenaere | | G05D 1/0858 701/3 |
| 2013/0056586 A1 * | 3/2013 | Occhiato | | B64D 1/02 244/137.4 |
| 2013/0146700 A1 * | 6/2013 | Wigard | | B64D 1/16 242/407 |
| 2014/0264209 A1 * | 9/2014 | Lin | | G01B 11/26 254/266 |
| 2015/0120126 A1 * | 4/2015 | So | | G01C 23/00 701/26 |
| 2015/0158587 A1 * | 6/2015 | Patrick | | B64C 39/024 244/137.4 |
| 2015/0360779 A1 * | 12/2015 | Behrens | | B64C 1/22 244/137.4 |
| 2016/0009393 A1 * | 1/2016 | Repp | | G06T 11/001 701/34.4 |
| 2016/0096623 A1 * | 4/2016 | Duffy | | B64C 39/024 244/118.1 |
| 2016/0340039 A1 * | 11/2016 | Waltner | | F16F 9/067 |
| 2017/0043872 A1 * | 2/2017 | Whitaker | | B64D 1/18 |
| 2017/0066530 A1 * | 3/2017 | Salzmann | | B64C 39/024 |
| 2017/0291707 A1 * | 10/2017 | Veronesi | | B66C 13/085 |
| 2018/0044019 A1 * | 2/2018 | Morrison | | B64D 1/22 |
| 2018/0072404 A1 * | 3/2018 | Prager | | B66D 1/485 |
| 2018/0312247 A1 * | 11/2018 | Ichihara | | B64C 27/08 |
| 2019/0193856 A1 * | 6/2019 | Prager | | G05D 1/0094 |
| 2019/0217952 A1 * | 7/2019 | Zawadzki | | G05D 1/0866 |
| 2019/0375615 A1 * | 12/2019 | Markwell | | B66C 13/40 |
| 2020/0087121 A1 * | 3/2020 | Ohayon | | B66C 13/08 |
| 2020/0180763 A1 * | 6/2020 | Schutz | | G05D 1/104 |

* cited by examiner

LOAD PLACEMENT SYSTEM

The present application claims priority to U.S. Provisional Patent Application Ser. No. 62/550,359, filed Aug. 25, 2017, entitled: LOAD PLACEMENT SYSTEM, which is incorporated by reference in its entirety.

TECHNICAL FIELD

One or more implementations relate generally to a load placement system for a helicopter.

BACKGROUND

Helicopters are used to haul loads into hard to reach locations. For example, heavy lift capacity helicopters may be used to suspend and transport sections of steel transmission towers. Guy lines are suspended from the loads and linemen positioned on the ground grab the guy lines and guide the suspended loads into place on mounting pads.

The suspended loads may have a tendency to swing and/or rotate due to wind conditions and/or swirling air masses caused by the helicopter's rotating blades. Consequently, it is extremely difficult for the linemen to secure the guy lines and lower the loads into the correct positions. It is also difficult to coordinate the movements of the load by the helicopter pilot with the movements of the load by the linemen.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

A load placement system precisely places slung loads by allowing a helicopter pilot to essentially reel the load to the ground. The placement system uses lead lines on the slung load that can be connected to the ground by support personnel. A winch system is connected to the lead lines and guides the load to an intended location. The load placement system eliminates at least some of the ground personnel previously needed for pulling the load to a target location and orientation. The placement system may eliminate substantially all ground personnel by using unmanned aerial vehicles (UAVs) to automatically connect the lead lines to the ground. The UAVs also may actively control the slung load while in flight to reduce pilot workload and enable higher transport speeds.

Figure 1:
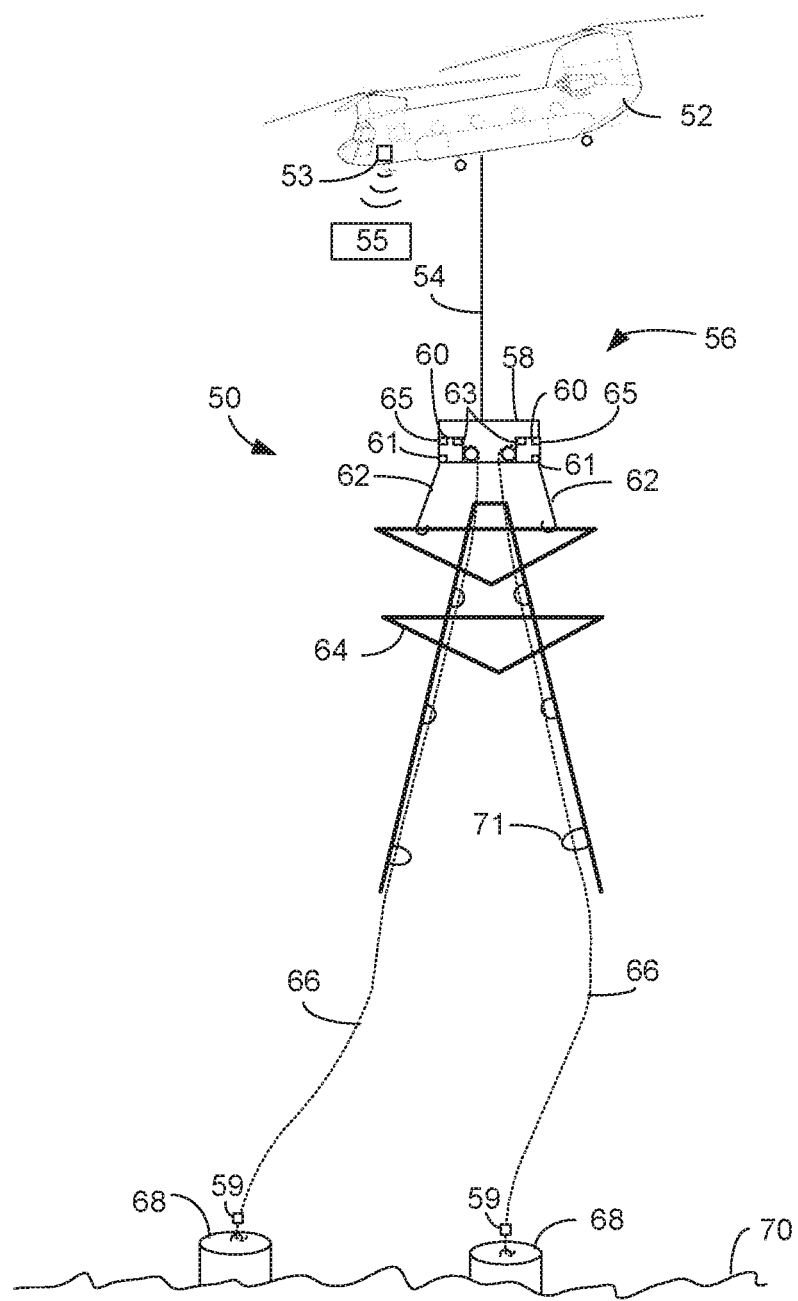
FIG. 1 shows an example load placement system.

FIG. 1 shows a load placement system 50 that includes a winch system 56 connected to a helicopter 52 via a sling line 54. Winch system 56 includes a metal frame 58 attached to sling line 54 that supports one or more winches 60. One or more release hooks 62 may attach to frame 58 and support a load 64.

A remote controller 53 in helicopter 52 may send wireless messages 55 to wireless processing devices 65 in winch system 56 to control winches 60 and receive messages and feedback from winch system 56. Processing devices 65 may control the rotational direction of reels on winches 60 and control clutches 61 on winches 60. Processing devices 65 may receive pressure readings from pressure sensors 63 located on winches 60. Any operations performed by winches 60 can be controlled by processing devices 65 via messages 55 sent by remote controller 53. Any feedback from winches 60 is transmitted back to remote controller 53 through transceivers located in processing devices 65.

In this example, load 64 is shown as a power transmission tower. However, it should be understood that load placement system 50 may be used to guide any type of load carried by helicopter 52. Winches 60 each include reels that hold lead lines 66. In one example, lead lines 66 are steel cables that may run through eyes 71 attached to load 64.

An operator or pilot in helicopter 52 can remotely control winches 60 via remote controller 53. For example, the helicopter operator may have remote controller 53 transmit messages 55 that cause winches 60 to unreel and create slack in lead lines 66. The helicopter operator also may have remote controller 53 transmit messages 55 that cause winches 60 to reel up and create tension and tighten lead lines 66.

Without winch system 56, a group of ground personnel would have to grab lead lines 66 and muscle a multi-ton load 64 onto ground target mounting locations referred to as hardpoints 68. The ground personnel would also have to communicate with the helicopter pilot to help direct load 64 over hardpoints 68. Placement of load 64 would be difficult since neither the helicopter pilot nor the ground personnel have complete control over load 64.

Load placement system 50 allows the operator in helicopter 52 to use winches 60 to reel and orient load 64 to an intended placement point, such as onto ground hardpoints 68, with little assistance from ground personnel.

The helicopter pilot or an operator in helicopter 52 may cause remote controller 53 to send messages 55 that cause winches 60 to reel out lead lines 66 through eyes 71 of load 64 down to a ground surface 70. A lineman may attach loops in loosely swinging lead lines 66 to hooks in ground hardpoints 68. The pilot then may use remote controller 53 to send messages 55 that cause winches 60 to reel in lead lines 66.

Lead lines 66 start to tighten guiding load 64 horizontally and vertically down over hardpoints 68. Remote controller 53 may send messages 55 that cause winches 60 to continue reeling in lead lines 66 while the pilot lowers helicopter 52 further lowering and orientating load 64 over hardpoints 68. When the ends of lead lines 66 are reeled up to the base of load 64, load 64 is positioned and aligned over and onto hardpoints 68.

Loops on the ends of lead lines 66 may be removed or disconnected from hardpoints 68 by lineman. In another example, remote controller 53 may transmit messages 55 that activate sensors 59 that remotely disconnect ends of lead lines 66 from hardpoints 68. Remote controller 53 then may send messages 55 to processing devices 71 that cause winches 60 to reel up lead lines 66 through eyes 71 into the reels. Remote controller 53 then may send messages 55 to processing devices 65 that remotely disconnect release hooks 62 from load 64. The pilot then may navigate helicopter 52 and load placement system 50 away from now mounted load 64.

By attaching eyes 71 to load 64 and feeding lead lines 66 through eyes 71, the pilot can use remote controller 53 to reel in lead lines 66 and create a tension in lead lines 66 that guides load 64 down over hardpoints 68. Continuing to reel in lead lines 66 and lowering helicopter 52 eventually moves and drops load 64 onto a precise position and orientation/ alignment with the lead line hardpoints 68 on ground 70.

Load placement system 50 gives the helicopter pilot more control over the placement of load 64 eliminating the need for a large ground support crew. Load placement system 50 allows the helicopter pilot to control via remote controller 53 both the height of load 64 above ground 70 and the orientation or alignment of load 64 over a particular ground location.

Winches 60 may be conventional pallet winches and clutches 61 may release and reel out when too much pressure is exerted on individual lead lines 66. Pressure sensors 63 on winches 60 also may remotely transmit the amount of pressure on each lead lines 66 to remote controller 53. Remote controller 53 may include a user interface that displays the readings from pressure sensors 63 to the pilot. The pilot can then move helicopter 52 in different directions to reduce pressure on particular lead lines 66. The pilot also may use remote controller 53 to release sling line 54 if necessary to release helicopter 52 from load placement system 50 and load 64.

Figure 2:
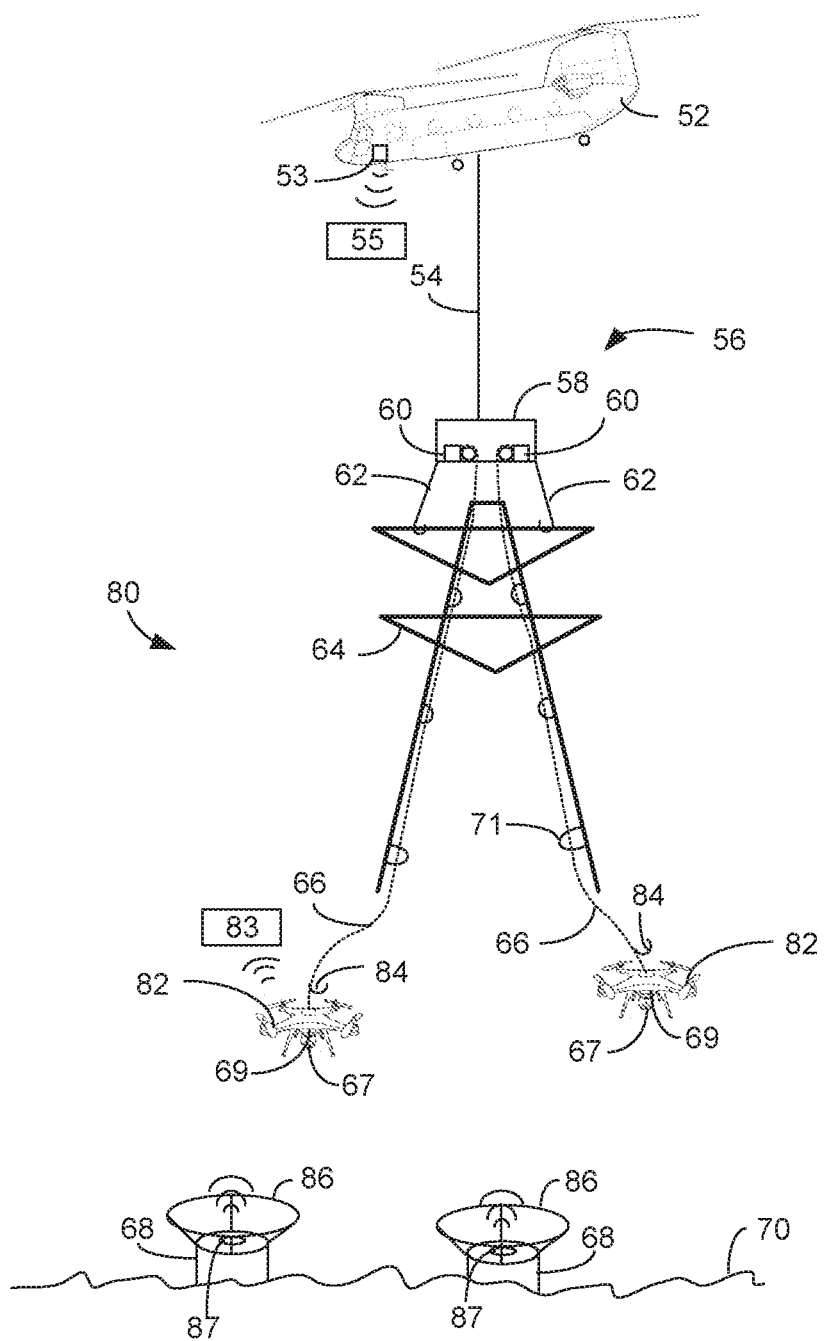
FIG. 2 shows an example load placement system that uses unmanned aerial vehicles (UAVs).

FIG. 2 shows another example load placement system 80 that uses unmanned aerial vehicles (UAVs) 82 alternatively referred to as drones to connect lead lines 66 to hardpoints 68. Winch system 56 and winches 60 may include the same processing devices 65, clutches 61, and sensors 63 described above in FIG. 1. However, these elements are not shown in FIG. 2.

UAVs 82 may be connected to the ends of lead lines 66. In one example, UAVs 82 each include a camera, radar, LIDAR, or any other combination of sensors 67 that can detect different objects. Each UAV 82 also may include a processing device 69 connected to sensors 67 that wirelessly communicates with remote controller 53 in helicopter 52. Processing devices 69 may include a global positioning system (GPS), a wireless transceiver for communicating with remote controller 53, and a microprocessor for controlling UAV 82 either autonomously or via messages 55.

UAVs 82 may fly along a same direction as helicopter 52 and load 64. The UAVs 82 may automatically track the movement of helicopter 52 and/or load 64, or the operator in helicopter 52 may manually steer UAVs 82. For example, processing devices 69 in UAVs 82 may read a latitude, longitude, and height position transmitted from helicopter 52, or may use optical sensors 67 to track the movement of helicopter 52 and/or load 64.

At some point relatively close to hardpoints 68, the operator in helicopter 52 may cause remote controller 53 to transmit a command 55 that directs UAVs 82 to attach the ends of lead lines 66 to hardpoints 68. UAVs 82 use cameras 67 and image recognition software stored in processing devices 69 to identify markers on hardpoints 68. In another example, hardpoints 68 may include homing beacons 87 and UAVs 82 may include wireless sensors in processing devices 69 that home in on the transmitted homing signals from beacons 87.

In response to receiving the attach command 55, UAVs 82 may automatically move over hardpoints 68 and attach connectors 84, such as loops, hooks, shackles, or the like, on the ends of lead lines 66 to rings 86 extending up from the top of hardpoints 68. Of course any other type of attachment mechanism may be used to remotely connect the ends of lead lines 66 to hardpoints 68.

Sensors 67 on UAVs 82 may detect positive connections between connectors 84 on the ends of lead lines 66 and hardpoints 68. Processing devices 69 in UAVs 82 may transmit connection notification messages 83 back to remote controller 53 in helicopter 52. In another example, connectors 84 may include transmitters that transmit a wireless connection signal 83 back to remote controller 53.

Remote controller 53 notifies the helicopter operator of the connections via the user interface. The helicopter operator then uses remote controller 53 and the same technique described above in FIG. 1 to tension lead lines 66 and guide load 64 onto hardpoints 68. The helicopter pilot again may use remote controller 53 to then remotely disconnect connectors 84 from hardpoints 68 or rings 86 and reel lead lines 66 back up into winches 60. The helicopter pilot then uses remote controller 53 to remotely disconnect release hooks 62 and disconnect load placement system 80 from load 64, and then fly away.

UAVs 82 may further reduce and/or eliminate the use of linemen on the ground to manually attach the ends of lead lines 66 to hardpoints 68. This example UAV placement system may have substantial advantages in remote locations with limited access.

Figure 3:
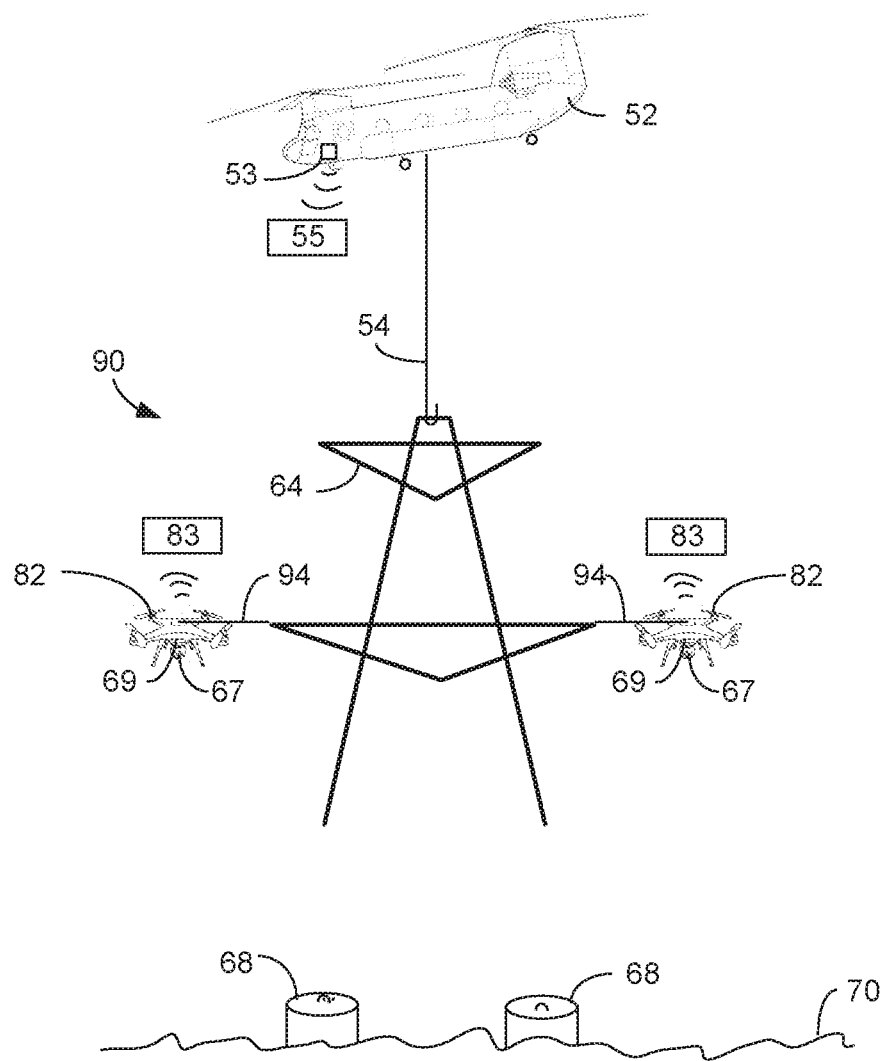
FIG. 3 shows an example load placement system that uses UAVs to guide a load.

FIG. 3 shows another example load placement system 90 that uses unmanned aerial vehicles (UAVs) 82 without lead lines. UAVs 82 may be connected to load 64 via connection links 94. UAVs 82 may fly along a same direction as helicopter 52 and load 64. The UAVs 82 may include the same video cameras/sensors 67 and processing devices 69 described above in FIG. 2. Remote controller 53 may automatically steer UAVs 82 with positioning messages 55 or UAVs 82 may automatically track helicopter 52 and/or load 64. In another example, an operator in helicopter 52 may manually and remotely steer UAVs 82 via remote controller 5**.

At some point relatively close to hardpoints 68, the operator in helicopter 52 may cause remote controller 53 to send a command 55 that directs UAVs 82 to move load 64 over hardpoints 68. UAVs 82 again may use cameras 67 and image recognition software in processing devices 69 to identify markers on hardpoints 68. In another example, hardpoints 68 again may include homing beacons 87 (FIG. 2) that wireless receivers in processings 69 use to locate hardpoints 68.

In response to receiving mount commands 55, UAVs 82 automatically move load 64 over hardpoints 68. Sensors 67 in UAVs 82 may detect a position of load 64 over hardpoints 68. For example, camera 67 may detect an image of hardpoints 68 or a marker on hardpoints 68 that matches a prestored image in processing device memory. In another example, a GPS sensor attached to processing device 69 may detect a latitude and longitude of points on load 64 that match prestored latitude and longitude positions of hardpoints 68.

Processing devices 69 in UAVs 82 may transmit an alignment notification message 83 back to remote controller 53. Remote controller 53 uses the user interface to notify the helicopter pilot to drop load 64 down onto hardpoints 68. UAVs 82 may continuously align load 64 over hardpoints 68 as the helicopter pilot lowers load 64. The helicopter pilot can then remotely disconnect sling line 54 from load 64 and fly away.

UAVs 82 may automatically eliminate any spinning or yaw of load 64 while carried by the helicopter 52 to a placement site. For example, UAVs 82 may provide a certain amount of aligned outward radial force on load 64 while being carried by helicopter 52.

In one example, processing devices 69 in UAVs 82 may include accelerometers or other inertial measurement units (IMUS) that prevent acceleration in any direction other than the direction of travel of helicopter 52 to substantially zero. The accelerometers in UAVs 82 may detect a movement of load 64 in a direction other than the direction of travel of helicopter 52. Processing devices 69 direct UAVs 82 to then move in an opposite direction to counter the rotational movement of load 64. This anti-rotation feature provided by UAVs 82 may allow helicopter 52 to travel at faster speeds while carrying load 64.

Figure 4:
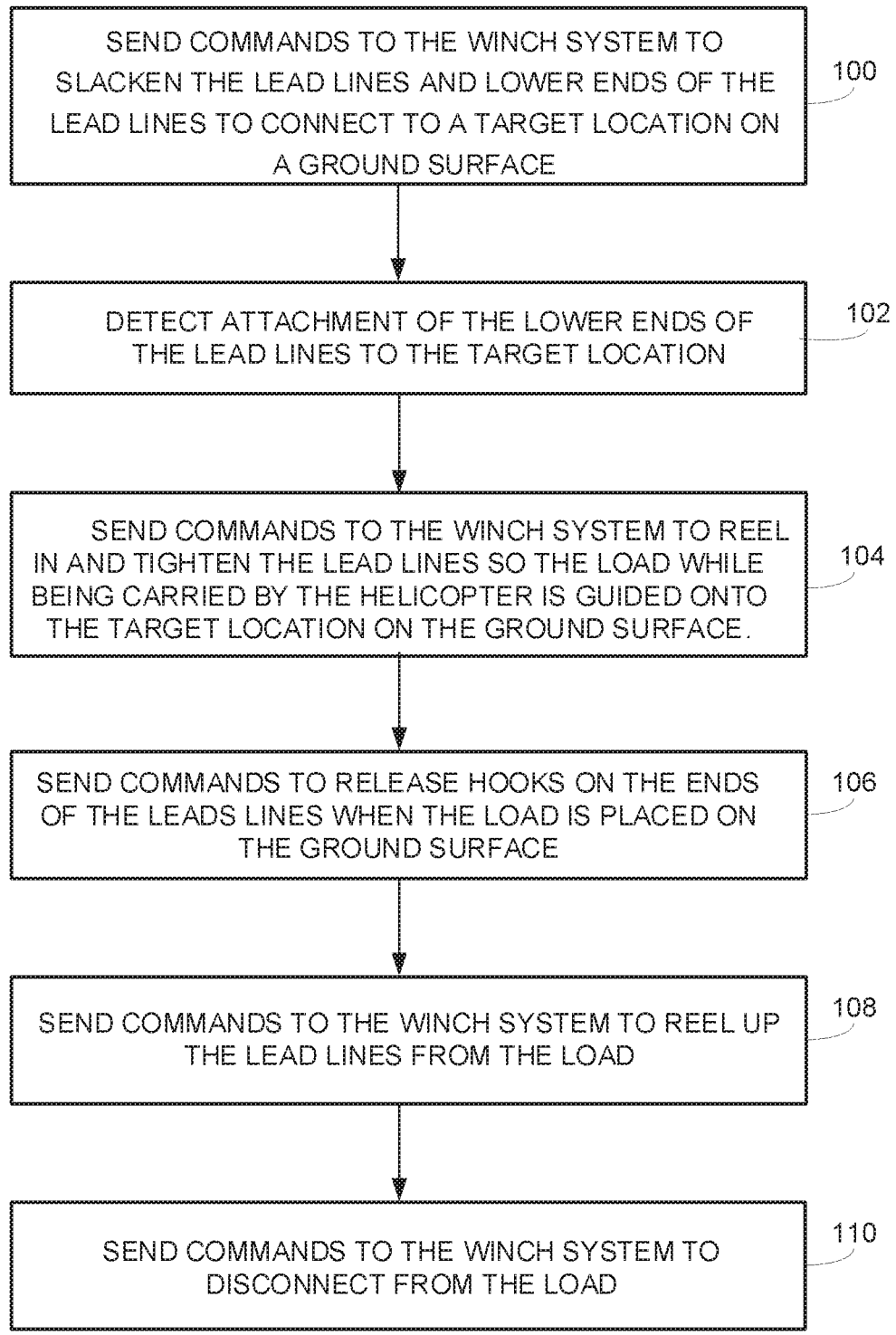
FIG. 4 shows an example process for using a remote controller to control the load placement system.

FIG. 4 shows one example of operations performed by the remote controller located in the helicopter. It should understood that any of the operations discussed above may be automatically performed by remote controller 53 or may be performed by remote controller 53 in response to a manual input from an operator. In operation 100, the remote controller sends commands to the winch system to slacken the lead lines and lower ends of the lead lines to connect to a ground surface.

In operation 102, remote controller 53 detects attachment of the lower ends of the lead lines to the target location. For example, personnel on the ground may attach the lower ends of the lead lines to the hardpoints and then send a message to remote controller 53 or to the helicopter operator. In another example, a sensor on the ends of the lead lines may send a wireless message back to remote controller 53.

In operation 104, remote controller 53 sends commands to the winch system to reel in and tighten the lead lines so the load while being carried by the helicopter is guided onto the target location on the ground surface. As explained above, during the installation operation the winch system may send pressure signals back to remote controller 53 indicating the tension on different lead lines.

In operation 106, after the load is placed on the ground surface, remote controller 53 may send commands to release connectors on the ends of the leads lines from hardpoints. For example, the hooks may each include sensors that release the hooks in response to the remote controller command. Otherwise, a lineman on the ground may manually release the connectors.

In operation 108, the remote controller may send commands to the winch system to reel up the lead lines from the load. For example, the lead lines may be reeled up through eyes 71 formed on the load and onto winch system reels. In operation 110, remote controller 53 then sends commands to the winch system to disconnect from the load. For example, the winch system may disconnect release hooks that attach the winch system to the load.

Figure 5:
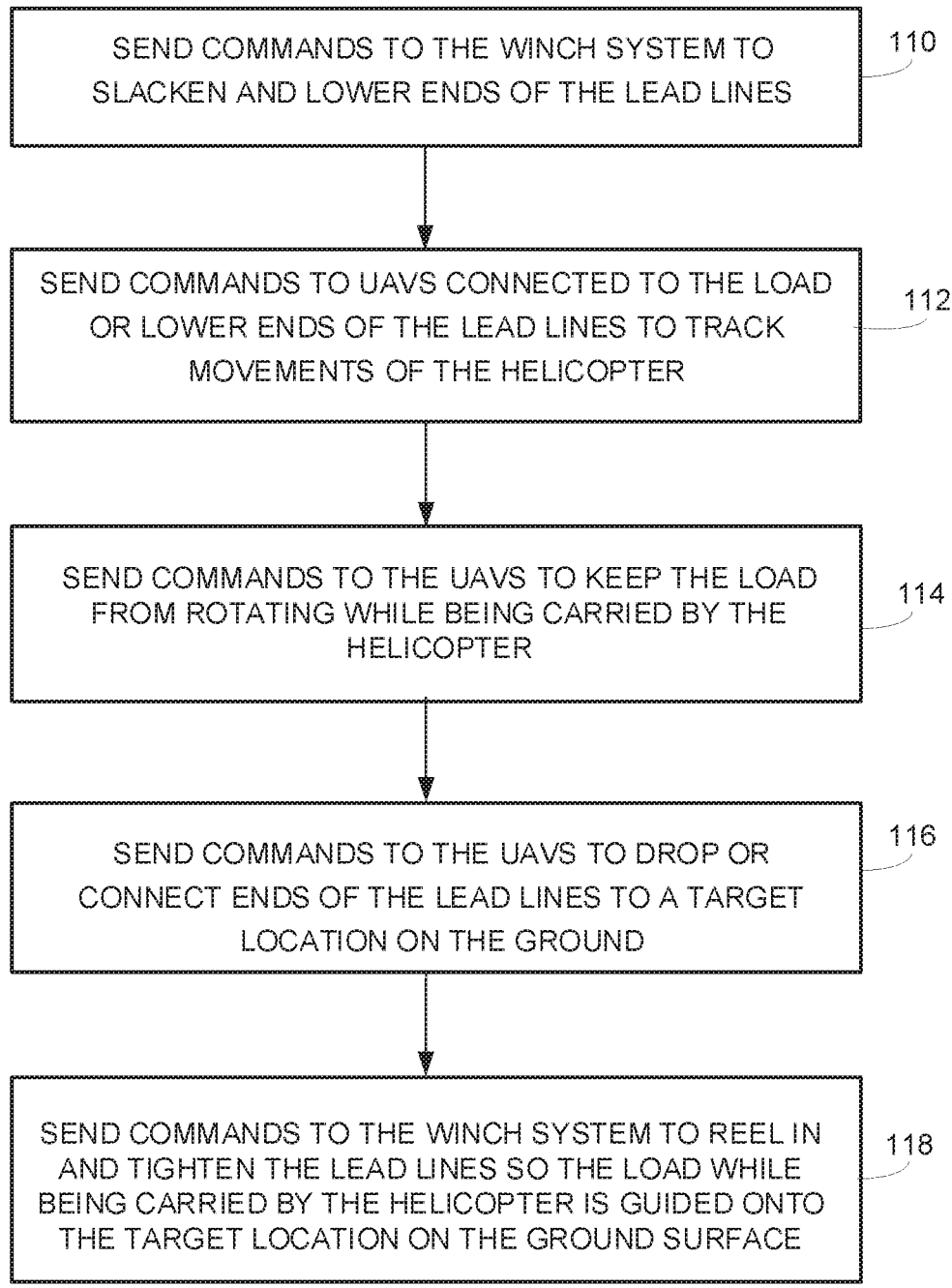
FIG. 5 shows an example process for using UAVs to guide a load onto a ground surface.

FIG. 5 shows example commands sent from the remote controller to the winch system and unmanned aerial vehicles (UAVs). In operation 110, remote controller 53 may again send commands to the winch system to slacken and lower ends of the lead lines.

In operation 112, remote controller 53 may send commands to the UAVs connected to the load or lower ends of the lead lines to track movements of the helicopter. As explained above, the UAVs may use sensors to automatically track movements of the helicopter or may receive commands from remote controller 53 that steer UAVs in a same direction as the helicopter.

In operation 114, remote controller 53 may send commands to the UAVs to keep the load from rotating while being carried by the helicopter. As explained above, the UAVs may move in a radially outward manner that prevents the load from rotating. Otherwise, the UAVs may include accelerometers and/or IMUs that detect load rotation and moves UAVs in a counter load rotating direction.

In operation 116, remote controller 53 may send commands to the UAVs to drop or connect ends of the lead lines to a target location on the ground. For example, the UAVs may drop the lead lines so an operator can manually attach the lead lines to hardpoints. Otherwise, the UAVs may automatically attach the ends of the lead lines to the hardpoints.

The UAVs may send a message back to remote controller 53 indicating the ends of the lead lines are now connected to the hardpoints. In operation 118, remote controller 53 then may send commands to the winch system to reel in and tighten the lead lines so the load while being carried by the helicopter is guided onto the target location on the ground surface. The remote controller 53 then uses the attached lead lines to guide the load onto the hardpoints as described above. If no lead lines are used, then UAVs guide the load as the helicopter lowers the load onto the ground surface.

Figure 6:
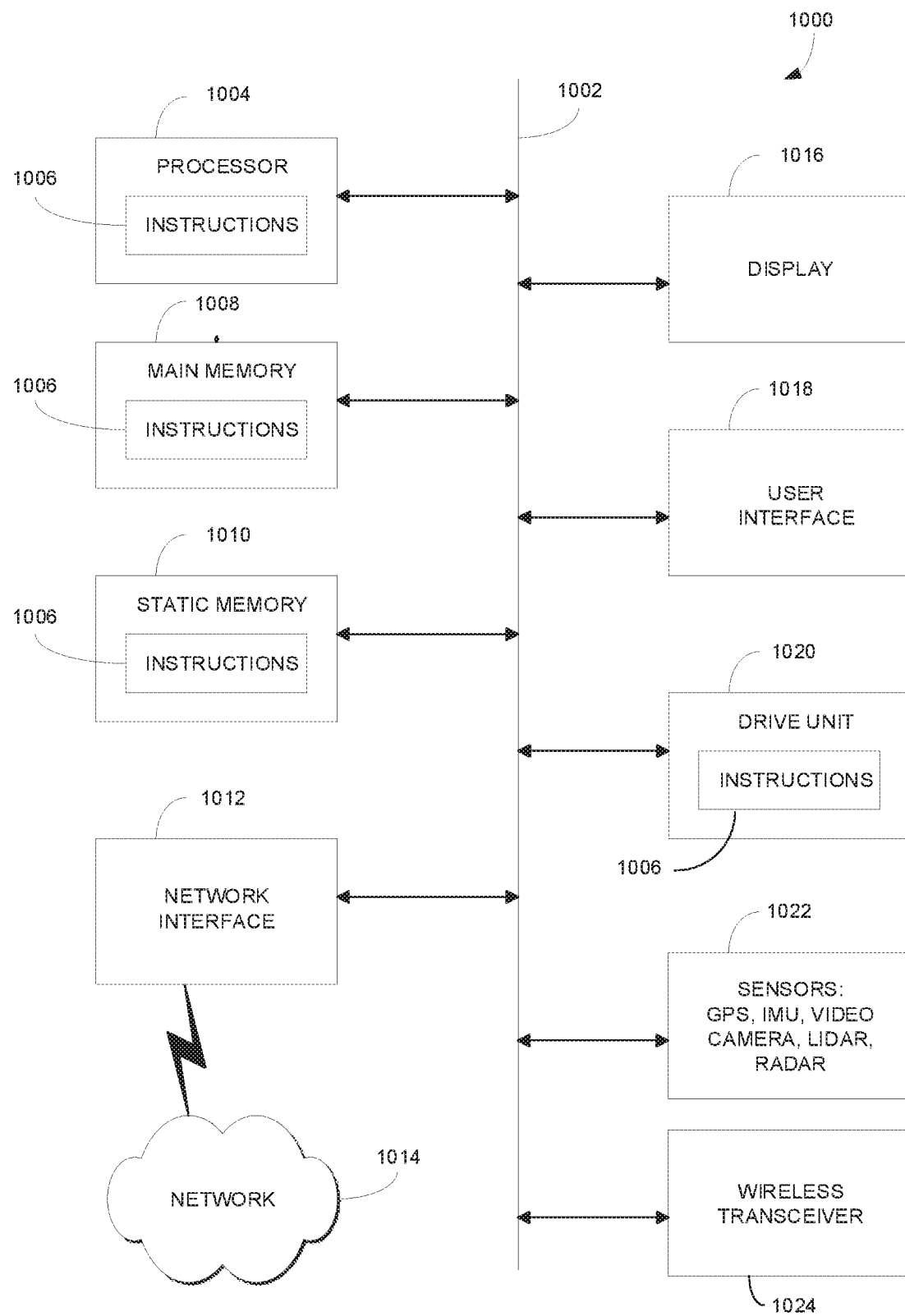
FIG. 6 shows an example computer system used in combination with the load placement system.

FIG. 6 shows a computing device 1000 that may be used for implementing or operating any of remote controller 53, processing device 65, or processing device 69 used in the load placement systems discussed above. The computing device 1000 may operate in the capacity of a server or a client machine in a server-client network environment, or as a peer machine in a peer-to-peer (or distributed) network environment. In other examples, computing device 1000 may be a personal computer (PC), a tablet, a Personal Digital Assistant (PDA), a cellular telephone, a smart phone, a web appliance, central processing unit, programmable logic device, or any other machine or device capable of executing instructions 1006 (sequential or otherwise) that specify actions to be taken by that machine.

While only a single computing device 1000 is shown, the computing device 1000 may include any collection of devices or circuitry that individually or jointly execute a set (or multiple sets) of instructions to perform any one or more of the operations discussed above. Computing device 1000 may be part of an integrated control system or system manager, or may be provided as a portable electronic device configured to interface with a networked system either locally or remotely via wireless transmission.

Processors 1004 may comprise a central processing unit (CPU), a graphics processing unit (GPU), programmable logic devices, dedicated processor systems, micro controllers, or microprocessors that may perform some or all of the operations described above. Processors 1004 may also include, but may not be limited to, an analog processor, a digital processor, a microprocessor, multi-core processor, processor array, network processor, etc.

Some of the operations described above may be implemented in software and other operations may be implemented in hardware. One or more of the operations, processes, or methods described herein may be performed by an apparatus, device, or system similar to those as described herein and with reference to the illustrated figures.

Processors 1004 may execute instructions or "code" 1006 stored in any one of memories 1008, 1010, or 1020. The memories may store data as well. Instructions 1006 and data can also be transmitted or received over a network 1014 via a network interface device 1012 utilizing any one of a number of well-known transfer protocols.

Memories 1008, 1010, and 1020 may be integrated together with processing device 1000, for example RAM or FLASH memory disposed within an integrated circuit microprocessor or the like. In other examples, the memory may comprise an independent device, such as an external disk drive, storage array, or any other storage devices used in database systems. The memory and processing devices may be operatively coupled together, or in communication with each other, for example by an I/O port, network connection, etc. such that the processing device may read a file stored on the memory.

Some memory may be "read only" by design (ROM) by virtue of permission settings, or not. Other examples of memory may include, but may be not limited to, WORM, EPROM, EEPROM, FLASH, etc. which may be implemented in solid state semiconductor devices. Other memories may comprise moving parts, such a conventional rotating disk drive. All such memories may be "machine-readable" in that they may be readable by a processing device.

"Computer-readable storage medium" (or alternatively, "machine-readable storage medium") may include all of the foregoing types of memory, as well as new technologies that may arise in the future, as long as they may be capable of storing digital information in the nature of a computer program or other data, at least temporarily, in such a manner that the stored information may be "read" by an appropriate processing device. The term "computer-readable" may not be limited to the historical usage of "computer" to imply a complete mainframe, mini-computer, desktop, wireless device, or even a laptop computer. Rather, "computer-readable" may comprise storage medium that may be readable by a processor, processing device, or any computing system. Such media may be any available media that may be locally and/or remotely accessible by a computer or processor, and may include volatile and non-volatile media, and removable and non-removable media.

Computing device 1000 can further include a video display 1016, such as a liquid crystal display (LCD) or a cathode ray tube (CRT) and a user interface 1018, such as a keyboard, mouse, touch screen, etc. All of the components of computing device 1000 may be connected together via a bus 1002 and/or network.

Computing device 1000 may include any combination of sensors 1022 including, but not limited to, GSP, IMU, video camera, LIDAR, and radar. Computing device 100 also may include a wireless transceiver 1024 for wirelessly transmitting and receiving commands to and from other computing devices.

For the sake of convenience, operations may be described as various interconnected or coupled functional blocks or diagrams. However, there may be cases where these functional blocks or diagrams may be equivalently aggregated into a single logic device, program or operation with unclear boundaries. Having described and illustrated the principles of a preferred embodiment, it should be apparent that the embodiments may be modified in arrangement and detail without departing from such principles.

The invention claimed is:

1. A load placement system, comprising:
one or more lead lines configured to attach to a load carried by a helicopter;
a winch system configured to attach to the helicopter and including one or more reels for reeling the lead lines in and out, the winch system further configured to slacken the lead lines so lower ends of the lead lines can connect to a target location on a ground surface and reel in and tighten the lead lines so the load while being carried by the helicopter is guided onto the target location on the ground surface; and
a remote controller located in the helicopter configured to control the winches and adjust tension between the lead lines and hardpoints connected to the lower ends of the lead lines, wherein the remote controller is configured to control the winches to maintain a selected tension on the lead lines as the helicopter lowers the load onto the target location.

2. The load placement system of claim 1, further comprising sensors located in the winch system configured to detect pressure readings on the lead lines and transmit the pressure readings to the remote controller.

3. The load placement system of claim 1, wherein the winch system includes a frame including release hooks coupled to the load, wherein the remote controller is configured to remotely activate the release hooks and detach the frame from the load.

4. The load placement system of claim 1, including hooks located on the lower ends of the lead lines configured to attach to hardpoints, the hooks remotely disconnected from the hardpoints in response to messages transmitted by the remote controller.

5. The load placement system of claim 1, including eyes located on the load, the lead lines configured to thread through the eyes and guide the load down onto the target location on the ground surface.

6. A non-transitory computer-readable medium of a remote controller for controlling a winch system attached to a helicopter and carrying a load, the winch system including one or more reels for reeling lead lines in and out, the medium storing a set of instructions that, when executed by a hardware processor of the remote controller, cause the remote controller to:
send commands to the winch system to slacken the lead lines and lower ends of the lead lines to connect to a target location on a ground surface;
transmit commands to one or more unmanned aerial vehicles (UAVs) attached to lower ends of the lead lines to move the ends of the lead lines to a target location on the ground;
send commands to the winch system to reel in and tighten the lead lines so the load while being carried by the helicopter is guided onto the target location on the ground surface send instructions to the winch system to slacken the lead lines so the UAVs can move the lower ends of the lead lines to the target location; and
send instructions to the winch system after receiving a connect message from the UAVs to reel in and tighten the lead lines so the load while being carried by the helicopter is guided onto the target location on the ground surface.

7. The non-transitory computer-readable medium of claim 6, wherein the set of instructions are further to cause the remote controller to:
send commands to the UAVs to track movements of the helicopter and move the ends of the lead lines in a same direction as the helicopter.

8. The non-transitory computer-readable medium of claim 6, wherein the set of instructions are further to cause the remote controller to:
send commands the UAVs to connect or drop the lower ends of the lead lines next to the target location.

9. The non-transitory computer-readable medium of claim 6, wherein the set of instructions are further to cause the remote controller to:
   send commands to the UAVs to keep the load from rotating while being carried by the helicopter.

\* \* \* \* \*